United States Patent
Zhang et al.

(10) Patent No.: US 8,126,667 B2
(45) Date of Patent: *Feb. 28, 2012

(54) MEASUREMENT BASED VOLTAGE STABILITY MONITORING AND CONTROL

(75) Inventors: Pei Zhang, Campbell, CA (US); Liang Min, Santa Clara, CA (US); Jian Chen, Palo Alto, CA (US)

(73) Assignee: Electric Power Research Institute, Inc., Charlotte, NC (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/131,997

(22) Filed: Jun. 3, 2008

(65) Prior Publication Data
US 2009/0299664 A1 Dec. 3, 2009

(51) Int. Cl.
*G01R 25/00* (2006.01)
(52) U.S. Cl. .......................... 702/65; 702/59; 702/182
(58) Field of Classification Search .......... 702/59–62, 702/64, 65, 182–185; 324/600, 602; 307/102; 700/295; 323/364
See application file for complete search history.

(56) References Cited

U.S. PATENT DOCUMENTS

| | | | | |
|---|---|---|---|---|
| 5,745,368 | A * | 4/1998 | Ejebe et al. | 702/164 |
| 7,236,898 | B2 * | 6/2007 | Kim et al. | 702/65 |
| 2008/0086239 | A1 * | 4/2008 | Zhang et al. | 700/295 |

OTHER PUBLICATIONS

Quintela et al., 'Improved Branch-Based Voltage Stability Proximity Indices: Part II: Application & Security Analysis', 2002, IEEE Publicaiton, pp. 115-119.*
Meliopoulos et al. 'Voltage Stability and Voltage Recovery: Load Dynamics and Dynamic VAR Sources', 2006, IEEE Publication, pp. 124-131.*
Smon et al., 'Local Voltage Stability Index Using Tellegen's Theorem', 2006, IEEE Publication, pp. 1267-1275.*
S. Deckmann et al., "Studies on Power System Load Flow Equivalencing", IEEE Trans. PAS, vol. PAS-99, No. 6, Nov./Dec. 1980, 2301-2310.
Taylor, C.W., "Power System Voltage Stability", McGraw hill, 1994.
Vu, D. et al., "Use of Local Measurement to Estimate Voltage-Stability Margin", IEEE Trans. Power Systems, 1997, 318-323.

* cited by examiner

*Primary Examiner* — Mohamed Charioui
*Assistant Examiner* — Elias Desta
(74) *Attorney, Agent, or Firm* — Trego, Hines & Ladenheim, PLLC

(57) ABSTRACT

A measurement base voltage stability monitoring and control scheme having a means for measuring current and voltage phasors at a boundary bus of a load center; and an equivalent network having a fictitious bus with an aggregate load representative of all loads of the load center. The scheme further includes a computing device to calculate a voltage stability margin index based on the aggregate load of the fictitious bus and compare the voltage stability margin index to a pre-set threshold. The computing device causes an action to take place based on the comparison between the voltage stability margin index and the pre-set threshold.

11 Claims, 4 Drawing Sheets

MEASUREMENT BASED VOLTAGE STABILITY MONITORING AND CONTROL

BACKGROUND OF THE INVENTION

The present invention relates generally to a voltage stability monitoring and control system/scheme, and more particularly to a system and a method for determining voltage stability margin at load centers to enhance power system voltage stability monitoring and control capability.

A load center is generally defined as a particular geographical area where load demand is high and has few local power plants to satisfy the local power demand. Because there are few local power plants to satisfy the demand, the load center is usually supplied by multiple transmission sources through a number of boundary buses, resulting in a high proportional amount of load demand being provided by external power systems and heavy power flow on the interface transmission lines.

Because of these properties, load centers are more susceptible to voltage instability and are typically voltage weak areas. Therefore, monitoring voltage stability at load centers is important and necessary. By monitoring the voltage stability condition at load centers and taking timely control actions, voltage instability can be effectively limited in its own area without expanding to the rest of the system.

One way to monitor and control voltage stability is by using Under Voltage Load Shedding (UVLS) schemes. UVLS schemes have been used in power systems as an economic means of avoiding voltage collapse. Voltage magnitude is used as triggering criteria in most of the UVLS schemes. As such, UVLS schemes shed load in pre-defined blocks that are triggered in stages when a local voltage drops to pre-defined levels. Voltage Instability Load Shedding (VILS) schemes have also been used to enhance conventional UVLS schemes. VILS schemes calculate the critical voltage and voltage stability margin continuously at a local bus using measured voltage and current waveforms.

Unfortunately, both UVLS and VILS schemes are only designed to monitor and control voltage stability at local buses, and are not competent to monitor and control voltage stability at load centers.

BRIEF SUMMARY OF THE INVENTION

These and other shortcomings of the prior art are addressed by the present invention, which provides a measurement based voltage stability monitoring and control (MBVSMC) scheme for monitoring and controlling voltage stability at load centers.

According to one aspect of the present invention, a voltage stability monitoring scheme includes a means for measuring current or voltage phasors at a boundary bus of a load center; an equivalent network having a fictitious bus with an aggregate load representative of all loads of the load center; and a computing device to calculate a voltage stability margin index based on the aggregate load of the fictitious bus and compare the voltage stability margin index to a pre-set threshold. The computing device causes an action to take place based on the comparison between the voltage stability margin index and the pre-set threshold.

According to one aspect of the present invention, a method of controlling voltage stability at load center includes the steps of measuring current and voltage phasors at a boundary bus of a load center; determining a maximum power transfer from an external system to the load center; and determining a voltage stability margin index using the maximum power transfer and comparing the voltage stability margin index to a pre-set threshold such that an action representative of the comparison may be initiated.

According to one aspect of the present invention, a method of controlling voltage stability at load center includes the steps of providing a voltage stability monitoring scheme having a means for measuring current and voltage phasors at a boundary bus of a load center; and an equivalent network having a fictitious bus to represent total power transferred to the load center. The method further including the steps of measuring current and voltage phasors at the boundary bus of the load center; using a calculated voltage and a calculated line current from the equivalent network to estimate a Thevenin equivalent representative of an external system; using the Thevenin equivalent to calculate a maximum power transfer from the external system to the load center; using the maximum power transfer to determine a voltage stability margin index; comparing the voltage stability margin index to a pre-set threshold; and taking an action representative of the comparison between the voltage stability margin index and the pre-set threshold.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
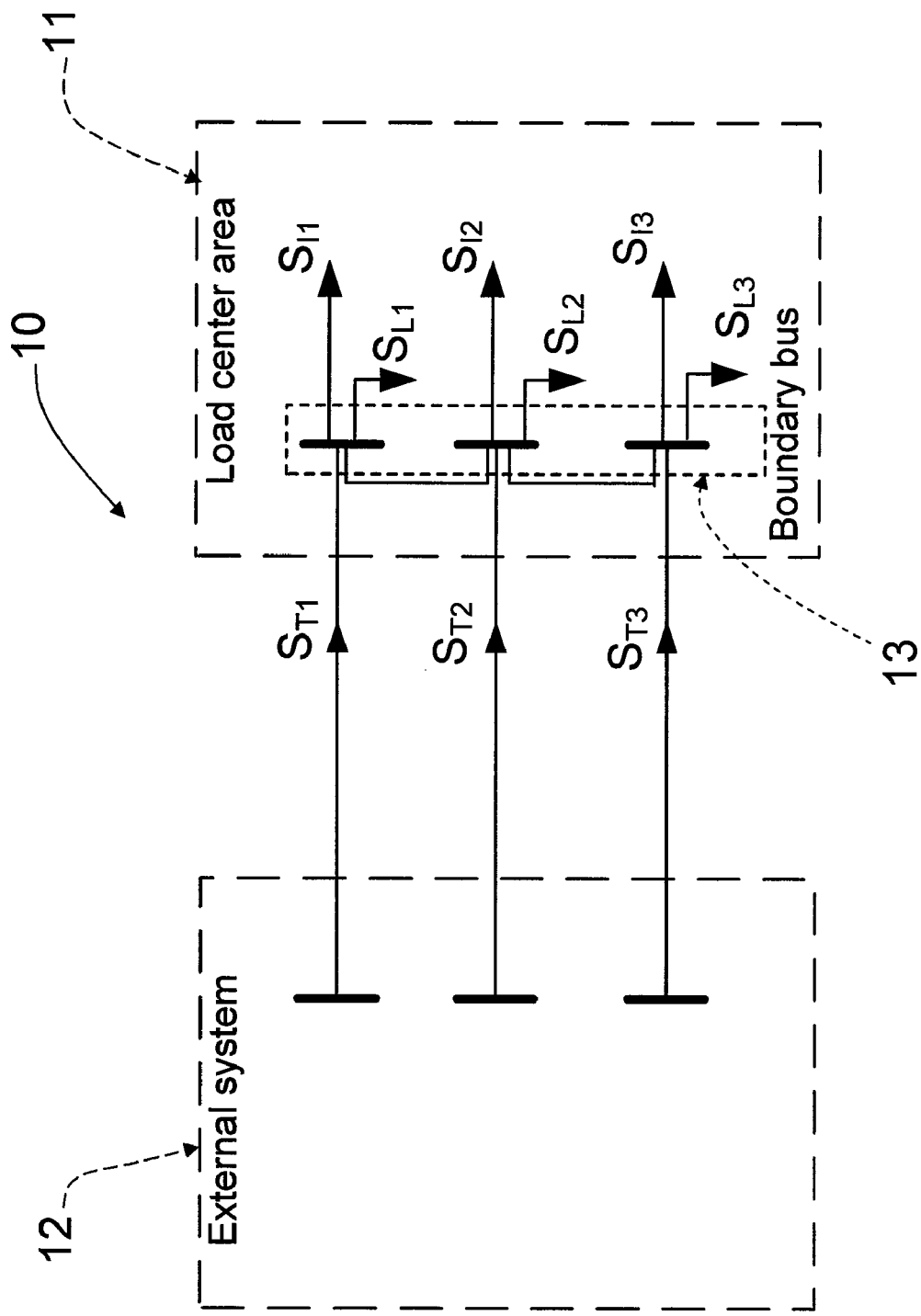
FIG. 1 shows the decomposition of a power system.

Referring to the drawings, an exemplary measurement based voltage stability monitoring and control (MBVSMC) scheme and method according to the present invention is illustrated in FIGS. 1-4.

The MBVSMC scheme calculates an index referred to as "Voltage Stability Margin" (VSM) index to continuously monitor and track the voltage stability condition at load centers. The VSM index may be expressed in terms of active, reactive, and apparent power, and may be used as an adaptive triggering criterion for further control actions.

The MBVSMC provides a means (such as a computer, volt and current meters, and any other suitable equipment or method) for measuring current and voltage phasors at boundary buses of a load center area by using an equivalent method to aggregate a total load of the load center area to a fictitious bus and estimating a Thevenin equivalent to represent the external power system. The MBVSMC then calculates the VSM index and compares the VSM with a pre-set threshold to decide whether to take the control actions. It should be appreciated that a control system, computer, relay, and any other suitable devices may be used to monitor the system, perform calculations, and perform control actions.

Referring to FIG. 1, an entire power system 10 may be decomposed into two parts: a load center 11 and an external power system 12. Power is transferred from the external power system 12 to the load center 11 through boundary buses 13. The power transfer from the external power system 12 to the load center 11 may be calculated using a measured current and/or voltage phasor at the boundary buses 13. For purposes of the calculations below, the general boundary bus number is denoted by "i", the power transfer from the external system to boundary bus i is denoted by "$S_{Ti}$", the local load at boundary bus i is denoted by "$S_{Li}$", and the power transfer from the boundary bus i to the internal part of the load center (not including the boundary buses) is denoted as "$S_{Ti}$". Accordingly, the power transfer through boundary bus i to the load center may be defined as:

$$S_i = S_{Li} + S_{Ti} \quad (1)$$

where "$S_i$" is the sum of the local load of boundary bus i and the power transfer from boundary bus i to an internal part of the load center.

Figure 2:
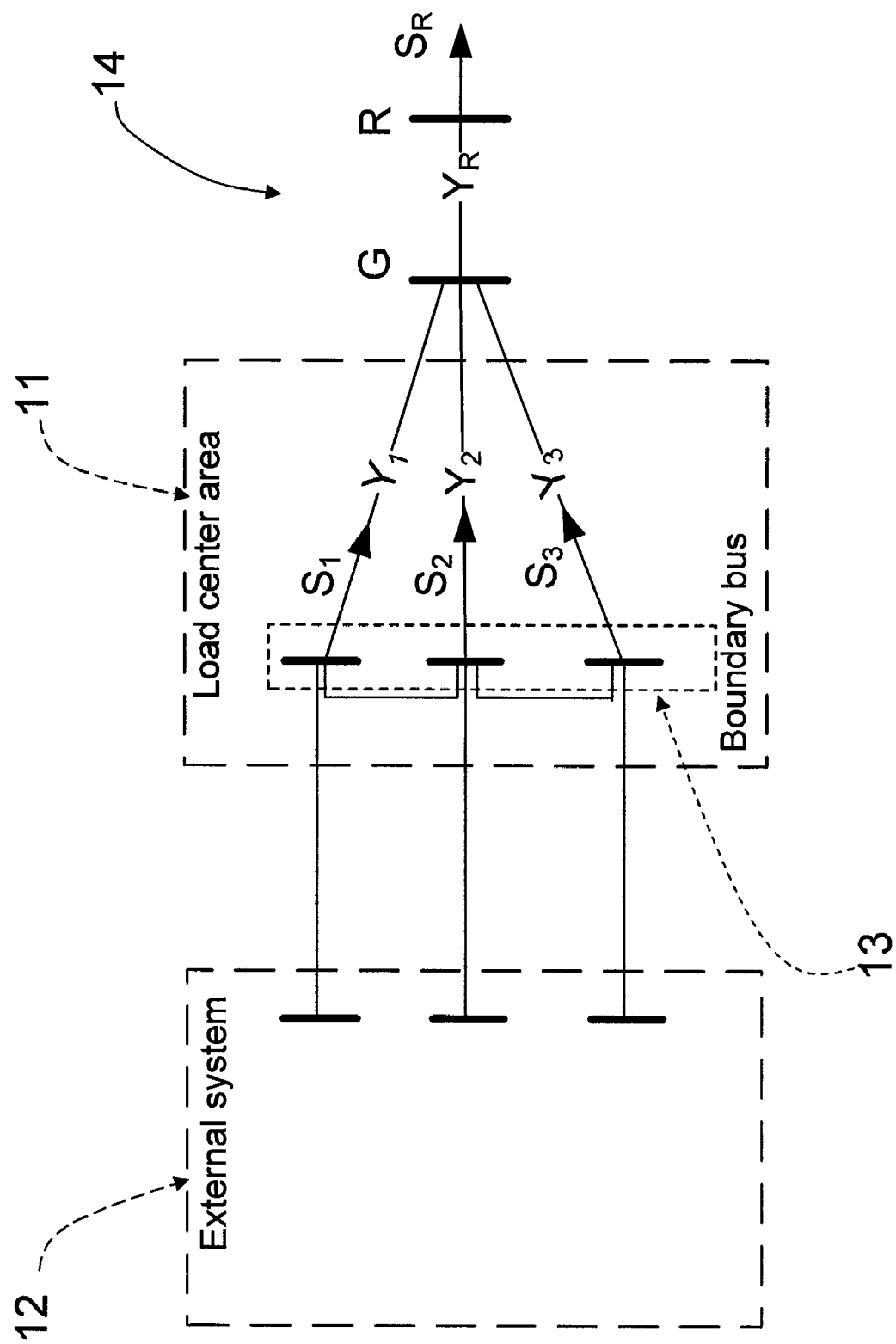
FIG. 2 shows an equivalent network to represent a load center.

Referring to FIG. 2, the load center 11 is represented by an equivalent network 14. The procedure for constructing an equivalent network 14 includes the steps of (1) creating a fictitious bus "R" and (2) connecting bus R with all of the boundary buses through a fictitious star network with a zero-voltage passive star point "G".

The fictitious bus R has a load "$S_R$" which is the total power transferred to the load center and is represented by the equation $$S_R = \sum_{i=1}^{n} S_i.$$

The voltage "$V_R$" at the bus R is calculated using the equation:

$$V_R = \frac{S_R}{\sum_{i=1}^{n}(S_i/V_i)} \quad (2)$$

where "$V_i$" is the voltage of boundary bus i.

The admittance of the branch i-G is chosen so that the power flow from boundary bus i to bus G is equal to the power transfer from boundary bus i to the load center. Thus, the admittance of the branch i-G can be calculated using the following equation:

$$Y_R = -S^*_R/V_R^2$$

$$Y_i = S^*_i/V_i^2 \quad (3)$$

Figure 3:
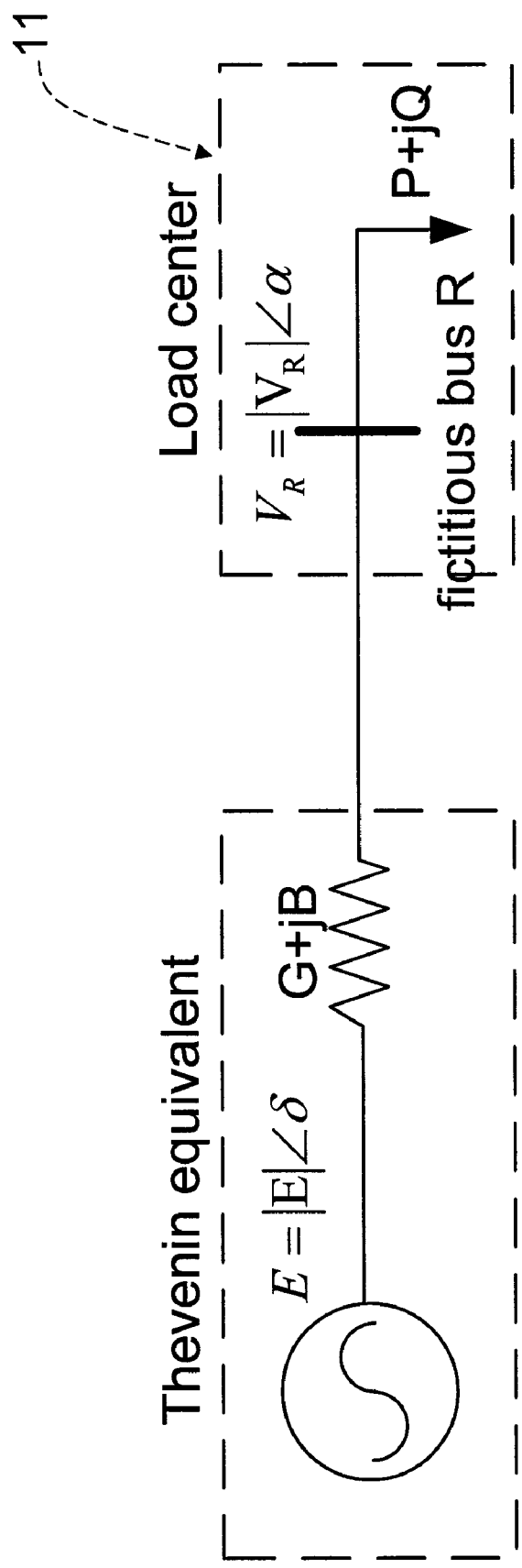
FIG. 3 shows a Thevenin equivalent to represent an external system.

Referring to FIG. 3, from the fictitious bus R looking back to the external power system 12, the rest of the system can be represented by a Thevenin equivalent:

$$E - ZI_R = V_R \quad (4)$$

where E is the Thevenin equivalent generator terminal voltage represented by $E = E_r + jE_i$; Z is the Thevenin equivalent impedance represented by $Z = R + jX$; $V_R$ is the calculated voltage at fictitious bus R represented by $V_R = m + jn$; and $I_R$ is the line current at bus R represented by $$I_R = \frac{S^*_R}{V^*_R} = p + jq.$$

Using the Thevenin equivalent parameters, Equation (4) can be written as:

$$\begin{bmatrix} 1 & 0 & -p & q \\ 0 & 1 & -q & -p \end{bmatrix} \begin{bmatrix} E_r \\ E_i \\ R \\ X \end{bmatrix} = \begin{bmatrix} m \\ n \end{bmatrix} \quad (5)$$

The real or actual power (P) and reactive power (Q) transferred from the system to the load center is represented by:

$$\begin{cases} P = |E||V_R||Y|\cos(\alpha - \delta - \beta) - |V_R|^2 G \\ Q = |E||V_R||Y|\sin(\alpha - \delta - \beta) + |V_R|^2 B \end{cases} \quad (6)$$

where "$|Y|$" is the magnitude and "$\beta$" is the angle of the Thevenin equivalent admittance $Y = Z^{-1} = G + jB$; "$|E|$" is the magnitude and "$\delta$" is the angle of Thevenin equivalent generator terminal voltage; and "$|V_R|$" is the magnitude and "$\alpha$" is the angle of voltage at fictitious bus R.

By substituting Q in Equation (6) with P·tan φ, where φ is the power factor of complex power we obtain:

$$P = -|V_R|^2|Y|\cos\phi\cos(\phi+\beta) + |Y|\cos\phi \\ \sqrt{|V_R|^2|E|^2 - |V_R|^4\sin^2(\phi+\beta)} \quad (7)$$

The maximum power transferred from the external system to the load center due to voltage stability constraints can be derived when $$\frac{\partial P}{\partial |V_R|} = 0.$$

The maximum power can then be calculated using the following equation:

$$P_{max} = \frac{|E|^2|Y|\cos\phi}{2[1 + \cos(\phi + \beta)]} \quad (8)$$

$$Q_{max} = \frac{|E|^2|Y|\sin\phi}{2[1 + \cos(\phi + \beta)]}$$

Figure 4:
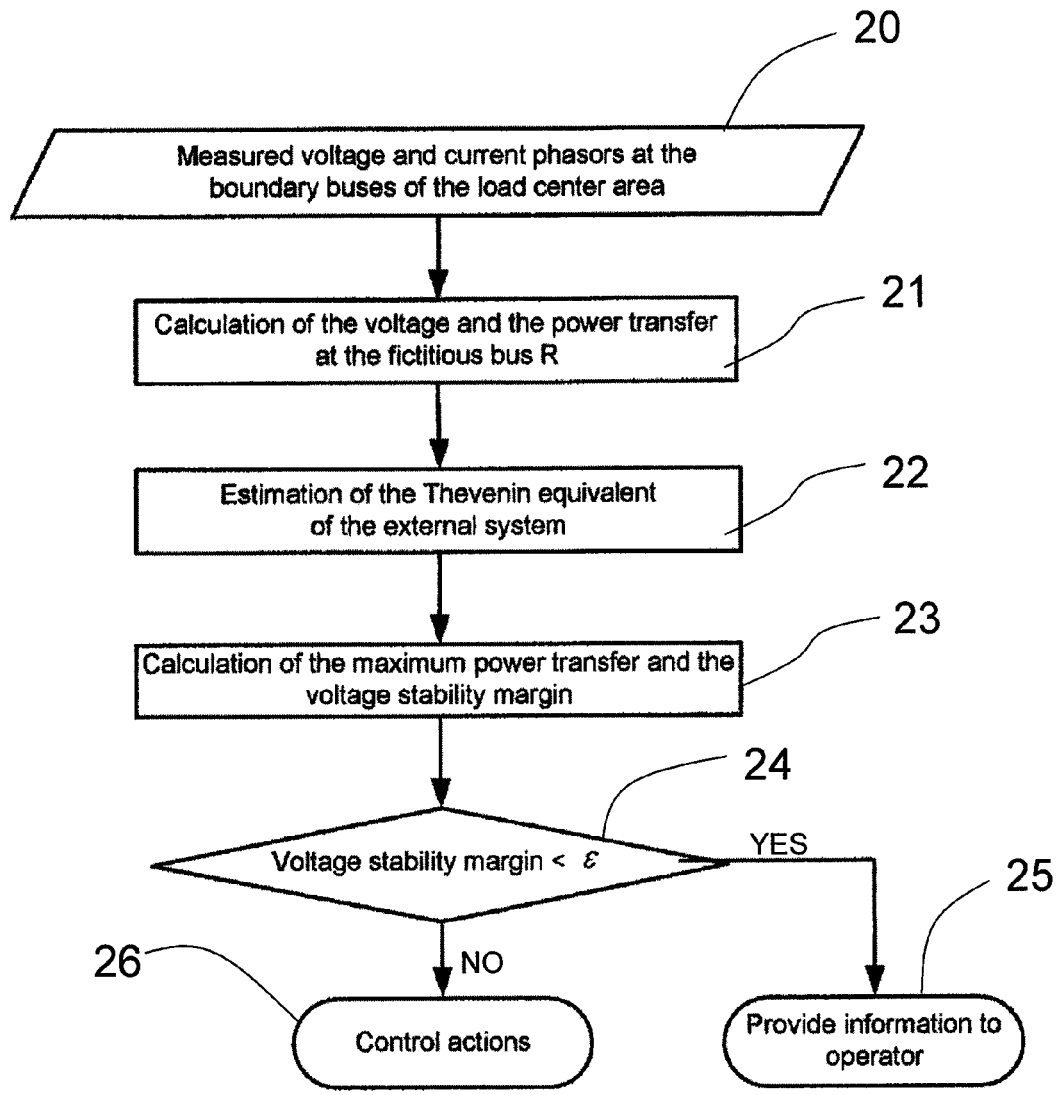
FIG. 4 is a flowchart of a Measurement Based Voltage Stability Monitoring and Control (MBVSMC) scheme.

Referring to FIG. 4, the process of determining whether to take action in the MBVSM scheme begins with measuring voltage and current phasors at the boundary buses 13 of the load center 11 (Block 20). These measurements are taken directly at the boundary buses 13. Once the measurements have been obtained from the buses 13 of the load center 11, a calculation of the voltage $V_R$ and the power transfer $S_R$ at the fictitious bus R (Block 21) may be calculated using equation (2). An estimation of the Thevenin equivalents E and Y of the external system is then performed using the Kalman filter method (Block 22).

With the Thevenin equivalents estimated, the maximum power transfer $P_{max}$ and $Q_{max}$ may be determined using equation (8) (Block 23). Using the maximum power transfer values, the Voltage Stability Margin (VSM) index is then determined (Block 23). The VSM may be expressed in terms of active power, Equation (9), reactive power, Equation (10), and apparent power, Equation (11).

$$P_{Margin} = P_{max} - P \quad (9)$$

$$Q_{Margin} = Q_{max} - Q \quad (10)$$

$$S_{Margin} = \sqrt{P_{max}^2 + Q_{max}^2} - S \quad (11)$$

With the VSM index determined, the index may then be compared with a user-defined threshold "ε" to determine whether actions need to be taken (Block 24), such as sending a warning message to a grid operator about the dangerous level of stability margin. As shown, the VSM index is sent to control center for operators to monitor voltage stability condition at the load centers (Block 25). If the VSM is less than the user-defined threshold, control actions are taken to enhance voltage stability margin at the load centers, such as sending a signal to activate a minimum amount of load shedding at a substation.

The foregoing has described a measurement based voltage stability monitoring and control scheme. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method of controlling voltage stability at load center, comprising the steps of:
    (a) using a measurement device to measure current and voltage phasors at a boundary bus of a load center;
    (b) using a computing device to:
        (i) create a fictitious boundary bus and aggregate all loads of the load center to the fictitious boundary bus;
        (ii) determine a current and voltage at the fictitious boundary bus using an aggregated current and aggregated voltage from the fictitious boundary bus to determine a maximum power transfer from an external system to the load center;
        (iii) determine a maximum power transfer from an external system to the load center using the determined current and voltage at the fictitious boundary bus; and
        (iv) determine a voltage stability margin index using from the determined maximum power transfer and compare the voltage stability margin index to a pre-set threshold such that an action based on the comparison is initiated.

2. The method according to claim 1, further including the step of determining an equivalent of the external system using the aggregated voltage and aggregated current of the fictitious boundary bus.

3. The method according to claim 1, further including the step of providing a warning message to a grid operator to indicate a level of the stability margin.

4. A method of controlling voltage stability at load center, comprising the steps of:
    (a) using a measurement device to measure current and voltage phasors at the boundary bus of the load center;
    (b) using a computing device to:
        (i) create an equivalent network having a fictitious bus;
        (ii) determine a voltage and a line current at the fictitious bus;
        (iii) determine a Thevenin equivalent representative of an external system;
        (iv) determine a maximum power transfer from the external system to the load center using the Thevenin equivalent;
        (v) determining a voltage stability margin index using the determined maximum power transfer;
        (vi) compare the voltage stability margin index to a pre-set threshold; and
        (vii) control voltage stability using the comparison between the voltage stability margin index and the pre-set threshold.

5. The method according to claim 4, further including the step of calculating the voltage of the equivalent network using $$V_R = \frac{S_R}{\sum_{i=1}^{n}(S_i/V_i)}.$$

6. The method according to claim 4, further including the step of calculating the total power transferred to the load center using $$S_R = \sum_{i=1}^{n} S_i.$$

7. The method according to claim 4, further including the step of calculating the line current of the equivalent network using $$I_R = \frac{S_R^*}{V_R^*} = p + jq.$$

8. The method according to claim 4, further including the step of calculating the maximum power transfer using $$P_{max} = \frac{|E|^2|Y|\cos\phi}{2[1+\cos(\phi+\beta)]}$$

$$Q_{max} = \frac{|E|^2|Y|\sin\phi}{2[1+\cos(\phi+\beta)]}.$$

9. The method according to claim 4, further including the step of calculating the voltage stability margin index for active power, reactive power, and apparent power.

10. The method according to claim 4, further including the step of using a Kalman filter to estimate the Thevenin equivalent.

11. The method according to claim 4, further including the step of sending a signal to activate a minimum amount of load shedding at a substation.

* * * * *